United States Patent
Park et al.

(10) Patent No.: US 7,881,827 B2
(45) Date of Patent: Feb. 1, 2011

(54) AIR CONDITIONER AND METHOD OF OPERATING THE SAME

(75) Inventors: Hee Woong Park, Changwon-si (KR); Dong Ju Kim, Changwon-si (KR); Nae Hyun Park, Changwon-si (KR)

(73) Assignee: LG Electronics Inc., Seoul (KR)

( * ) Notice: Subject to any disclaimer, the term of this patent is extended or adjusted under 35 U.S.C. 154(b) by 67 days.

(21) Appl. No.: 12/385,015

(22) Filed: Mar. 27, 2009

(65) Prior Publication Data

US 2010/0168922 A1    Jul. 1, 2010

(30) Foreign Application Priority Data

Dec. 26, 2008   (KR)   ...................... 10-2008-0134658

(51) Int. Cl.
  *G01M 1/38*   (2006.01)
(52) U.S. Cl. .......................... 700/277; 236/51; 454/312
(58) Field of Classification Search ......... 700/276–277; 236/51; 454/256, 309, 312, 318
See application file for complete search history.

(56) References Cited

U.S. PATENT DOCUMENTS 5,331,825 A    7/1994   Kim

FOREIGN PATENT DOCUMENTS

EP    1 460 351    9/2004
GB    2 260 830    4/1993

*Primary Examiner*—Clifford H Knoll
(74) *Attorney, Agent, or Firm*—McKenna Long and Aldridge LLP (57) ABSTRACT

The present invention relates to an air conditioner and a method of operating the same. The air conditioner includes a human body detection unit configured to rotatably operate and to detect a person within an indoor area, a position determination unit configured to determine a position of the person using data detected by the human body detection unit and to set a reference area to which a current of air will be provided according to a frequency of detection on the person, and a control unit configured to control the human body detection unit so that the human body detection unit detects the person by a reference frequency or more and to control the current of air based on the determination results by the position determination unit so that the current of air is discharged toward the reference area.

11 Claims, 5 Drawing Sheets

AIR CONDITIONER AND METHOD OF OPERATING THE SAME

This application claims priority to Korean Application No. 10-2008-0134658, filed on Dec. 26, 2008, the contents of which is hereby incorporated by reference in its entirety.

BACKGROUND OF THE INVENTION

1. Field of the Invention

The present invention relates to an air conditioner and a method of operating the same and, more particularly, to an air conditioner and a method of operating the same, which is capable of calculating a position of the human body by detecting the human body and automatically controlling a current of air based on the calculated position.

2. Discussion of the Related Art

An air conditioner is configured to control room temperature by discharging cooling or warm air into the interior of a room in order to make comfortable indoor environment and to provide more comfortable indoor environment to human beings by purifying indoor air. An air conditioner generally includes an indoor unit and an outdoor unit. The indoor unit is configured to include a heat exchanger and is placed indoors. The outdoor unit is configured to include a compressor, a heat exchanger, etc. and is configured to supply refrigerants to the indoor unit.

The air conditioner is controlled in the state where the indoor unit, including the heat exchanger, and the outdoor unit, including the compressor, the heat exchanger, etc., are separated from each other. The air conditioner is operated by controlling power applied to the compressor or the heat exchanger. Further, at least one indoor unit may be connected to the outdoor unit of the air conditioner, and the air conditioner operates in air cooling or heating mode by supplying the refrigerants to the indoor unit according to a requested operating state.

Wind direction control means for controlling the direction of the wind discharged into the interior of a room is included in the discharge port of this air conditioner. The direction of the wind can be changed by manipulating a wind direction setting button included in a remote controller, etc.

In the conventional air conditioner, the direction of the wind is adjusted through manual manipulation as described above. If a user is far from the air conditioner or frequently moves here and there, it is not easy to adjust the direction of the wind. Accordingly, a problem arises because it is difficult for a user to feel comfortable.

In order to overcome the problem in controlling the direction of the wind, technology for controlling a current of air according to the position of a user within a room has recently been developed.

When a position of the human body is determined, however, a case where the human body is detected at several positions is generated. In this case, it is necessary to designate a specific position as a reference position in order to provide the current of air on the basis of the reference position, but criteria for designating the reference position are not clear. If the reference position is erroneously designated, it may make a user feel uncomfortable.

SUMMARY OF THE INVENTION

It is, therefore, an object of the present invention to provide an air conditioner and a method of operating the same, which, in the case where the air conditioner detects the human body and controls the direction of discharged air based on a detected position of the human body, detects the human body several times and calculates an area where the human body is placed based on accumulated data, thereby being capable of more precisely calculating an area where the control of an air current will be performed and controlling the current of air on the basis of the detection of the human body.

An air conditioner according to an embodiment of the present invention includes a human body detection unit configured to rotatably operate and to detect a person within an indoor area, a position determination unit configured to determine a position of the person using data detected by the human body detection unit and to set a reference area to which a current of air will be provided according to a frequency of detection on the person, and a control unit configured to control the human body detection unit so that the human body detection unit detects the person by a reference frequency or more and to control the current of air based on the determination results by the position determination unit so that the current of air is discharged toward the reference area.

The air conditioner further includes a wind direction control unit configured to control a direction of the discharged air in response to a control command of the control unit. The wind direction control unit receives angle data for the reference area from the position determination unit and changes left and right discharge angles of each of discharge ports based on the received angle data.

The air conditioner further includes an indoor fan control unit configured to control the intensity of the discharged air in response to a control command of the control unit. The indoor fan control unit receives distance data for the reference area from the position determination unit and sets an air volume based on the received distance data.

If, as a result of the detection on the person through the human body detection unit, there is a plurality of areas where the person is detected, the position determination unit temporarily sets an area where the person is placed in response to the frequency of detection depending on detection on the person on a round of detection. After the human body detection unit has detected the person by the reference frequency or more, the position determination unit totals the areas temporarily set every round of detection and finally sets an area having a high frequency of detection, which belong to the temporarily set areas, as the reference area.

If the human body detection unit detects the person by the reference frequency or more, the position determination unit calculates a total of frequencies of detection on the person in each of areas and sets an area having a high frequency, which belongs to the areas, as the reference area.

Further, if areas having the same frequency of detection exist, the position determination unit primarily sets an area having a long distance, which belongs to the areas, as the reference area.

A method of operating an air conditioner according to the present invention includes the steps of a human body detection unit rotatably operating, detecting a person within an indoor area, and storing the detection data, when a frequency of detection is a reference frequency or more, calculating a frequency of detection in each of areas based on the detection data, setting an area having a high frequency of detection, which belongs to the areas, as a reference area, and setting an air volume for the reference area and providing a current of air toward the reference area.

After the detection and storing step, the method further includes the step of setting a discharge angle of each of discharge ports in response to angle data according to the detection on the person.

After the detection and storing step, the method further includes the step of, if the person is detected within a plurality of areas, calculating a frequency of detection every round of detection and primarily determines areas according to positions of the person. The step of setting the reference area includes, if the person is detected in a plurality of areas, totaling the primarily determined results and setting an area, having a high frequency of detection, as the reference area.

The step of setting the reference area includes calculating a total of frequencies in each of areas by accumulating results detected by the reference frequency or more and setting an area, having a high frequency of detection, as the reference area.

The step of setting the reference area includes, when there are areas having the same frequency of detection, setting the reference area by primarily considering an area having a long distance.

According to the air conditioner and the method of operating the same according to the present invention, when the direction of discharged air is controlled based on the detection of the human body, the human body is detected several times and a position of the human body is determined according to the frequency of detection based on the accumulated data. Accordingly, the degree of accuracy when a position of the human body is detected can be improved and, although the human body is detected several times, a person who frequently moves within a room can be taken into consideration. Consequently, there are advantages in that a more comfortable indoor environment can be provided to users and the degree of satisfaction can be increased.

BRIEF DESCRIPTION OF THE DRAWINGS

The above and other objects and features of the present invention will become apparent from the following description of some embodiments given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
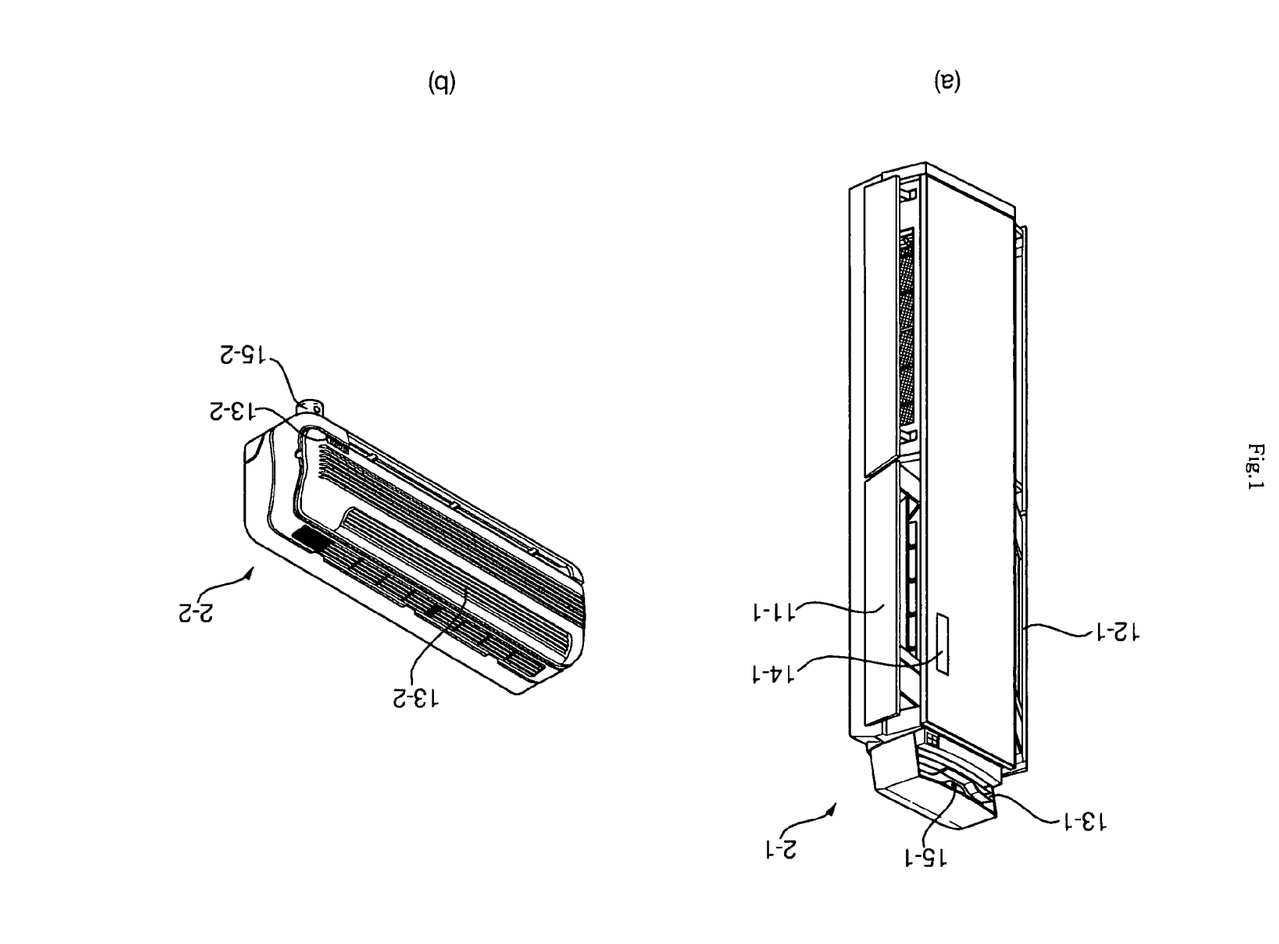
FIG. 1 is a perspective view showing an air conditioner according to an embodiment of the present invention.

FIG. 1 is a perspective view showing an air conditioner according to an embodiment of the present invention. FIG. 1(a) shows an example of a stand type indoor unit, and FIG. 1(b) shows an example of a wall-mount indoor unit. The air conditioner according to an embodiment of the present invention may be applied to any air conditioners, such as a stand air conditioner, a wall-mount air conditioner, and a ceiling type air conditioner.

The air conditioner of the present invention includes an indoor unit 2-1 and an outdoor unit (not shown). The indoor unit 2-1 and the outdoor unit are coupled to each other via a refrigerant pipe.

The outdoor unit includes a compressor, an outdoor heat exchanger, and so on. The outdoor unit compresses or performs heat exchange between the refrigerants and supplies the refrigerants to the indoor unit according to an operating state of the air conditioner. The outdoor unit is driven at the request of the indoor unit and is configured to have a varying cooling/heating capacity according to the driven indoor unit. Accordingly, the number of outdoor units driven and the number of compressors driven, included in the outdoor unit, are changed depending on the varying cooling/heating capacity.

The outdoor unit includes the compressor for compressing the refrigerants supplied thereto, the outdoor heat exchanger for performing heat exchange between the refrigerants and an outdoor air, an outdoor fan, an accumulator for extracting gaseous refrigerants from the refrigerants and supplying the extracted refrigerants to the compressor, and a 4-way valve for selecting the flow of the refrigerants according to a heating operation. The outdoor unit further includes a pressure sensor configured to detect the pressure of the refrigerants discharged from the compressor and the pressure of the refrigerants supplied to the compressor and a temperature sensor connected to a refrigerant pipe and configured to detect the temperature of the refrigerants. The outdoor unit further includes a number of sensors, valves, an oil collector, etc., but descriptions thereof are omitted.

The indoor unit includes an indoor heat exchanger, an indoor unit fan, an expansion valve for expanding the refrigerants supplied from the outdoor unit, and a number of sensors.

One indoor unit may be connected to one outdoor unit or a plurality of indoor units may be connected to one outdoor unit according to circumstances. One or more indoor units may be placed within a room.

The outdoor unit and the indoor unit constructed as above are connected to each other via the refrigerant pipe, and they are configured to perform an air cooling or heating operation according to the flow of the refrigerants and to exchange data using a communication method.

Referring to FIG. 1(a), the indoor unit 2-1 includes a human body detection unit 15-1. The human body detection unit 15-1 is configured to separate the human body and human body mistake factors from among heat sources based on radiation signals for the radiation heats of the heat sources and outputs a human body detection signal.

The indoor unit 2-1 further includes a left discharge port 12-1, a right discharge port 11-1, and an upper discharge port 13-1 for discharging an air current into the interior of a room. An indoor fan for sucking in an indoor air and generating ventilation power so that the sucked-in air is discharged outside and an indoor heat exchanger for performing heat exchange between the air, blown by the indoor fan, and the refrigerants are included within the indoor unit 2-1. The indoor unit 2-1 further includes a channel along which air is sucked in through air intake ports formed on the lower side of the indoor unit 2-1, air-conditioned within the indoor unit 2-1, and then discharged through at least one of the left discharge port 12-1, the right discharge port 11-1, and the upper discharge port 13-1. Here, vanes are formed to open or shut the air intake ports and at least one of the left discharge port 12-1, the right discharge port 11-1, and the upper discharge port 13-1 and to provide guidance to air. The vanes function to open or shut the respective air intake ports and the respective discharge ports and to also provide guidance to the direction of an intake air and a discharge air.

The indoor unit 2-1 further includes a display unit 14-1 for displaying an operating state and setting information of the indoor unit and an input unit (not shown) for inputting set data.

Although it is illustrated that the display unit 14-1 is placed under the discharge port 13-1, the display unit 14-1 may be placed in the front panel of the indoor unit 2-1, and the position of the display unit 14-1 may vary depending on the design. Further, the input unit may include entry means, such as at least one button or switch, a touch pad, or a touch screen, and receive data.

It is illustrated that the upper discharge port 13-1 of the indoor unit 2-1 is driven up and down, but not limited thereto. In the case where the human body detection unit 15-1 is placed in the upper discharge port 13-1 as shown in FIG. 1(*a*), the upper discharge port 13-1 may be placed or constructed in such a way as to detect the human body when the indoor unit 2-1 operates.

It is illustrated that the human body detection unit 15-1 is placed in the upper discharge port 13-1 of the indoor unit, but the position of the human body detection unit 15-1 may vary depending on the design. For example, the human body detection unit 15-1 may be placed on the upper portion of the upper discharge port 13-1 or may be projected from the top of the indoor unit and then rotatably operated.

The human body detection unit 15-1 is configured to rotatably operate and detect a person within a room by scanning the room within a predetermined range. Here, the human body detection unit 15-1 may include at least one infrared sensor.

The human body detection unit 15-1 rotatably operates and scans an indoor area, and detects a person within a room by detecting the radiation heats of heat sources using the sensor.

The human body detection unit 15-1 scans the indoor area while rotating in a first rotation direction and a second rotation direction, accumulates and stores scanned data, and detects the human body based on the accumulated stored data.

The indoor unit 2-1 performs a preparation operation before an automatic operation is performed based on the detection of the human body using the human body detection unit 15-1 so that, when a current of air is controlled based on the detection of the human body, a smooth and effective operation can be performed.

The indoor unit 2-1 determines whether to start the automatic operation based on the detection of the human body in response to input data or a detected indoor environment or both. If a condition is not satisfied, the indoor unit terminates the automatic operation based on the detection of the human body.

Referring to FIG. 1(*b*), an indoor unit 2-2 includes a human body detection unit 15-2 which is placed at the bottom of the main body and configured to rotatably operate.

A description of the remaining construction of the indoor unit 2-2 is the same as that given with reference to the indoor unit 2-1. Here, the shape of discharge ports and the structure of vanes or rubber, and a method of controlling the same differ depending on the types of indoor units, but the indoor units in common include an air intake port, discharge ports, a heat exchanger, and an indoor fan.

The human body detection unit 15-2 may be placed within the main body of the indoor unit 2-2. In this case, when the indoor unit performs the automatic operation based on the detection of the human body, the human body detection unit 15-2 may drop and rotate on the lower side of the main body of the indoor unit 2-2, thereby scanning the indoor area. Here, the human body detection unit 15-2 may, as described above, include at least one infrared sensor and detects a person within a room by detecting the radiation heat of the human body using the sensor.

Here, the human body detection unit 15-2 may rotate 180° and scan the indoor area or may rotate 360° and scan the indoor area according to circumstances. The human body detection unit 15-2 may preferably rotate 270° and perform a rotation operation with consideration taken of that the indoor unit is placed on a wall.

The human body detection unit may be placed in the main body of the indoor unit, as shown in FIG. 1(*a*) or (*b*), and the range of a detection area may vary depending on the position and shape of the human body detection unit. It is to be noted that the above examples are only illustrative, and any position or structure or both which is capable of detecting the human body by scanning the indoor area may be applied to the human body detection unit.

Figure 2:
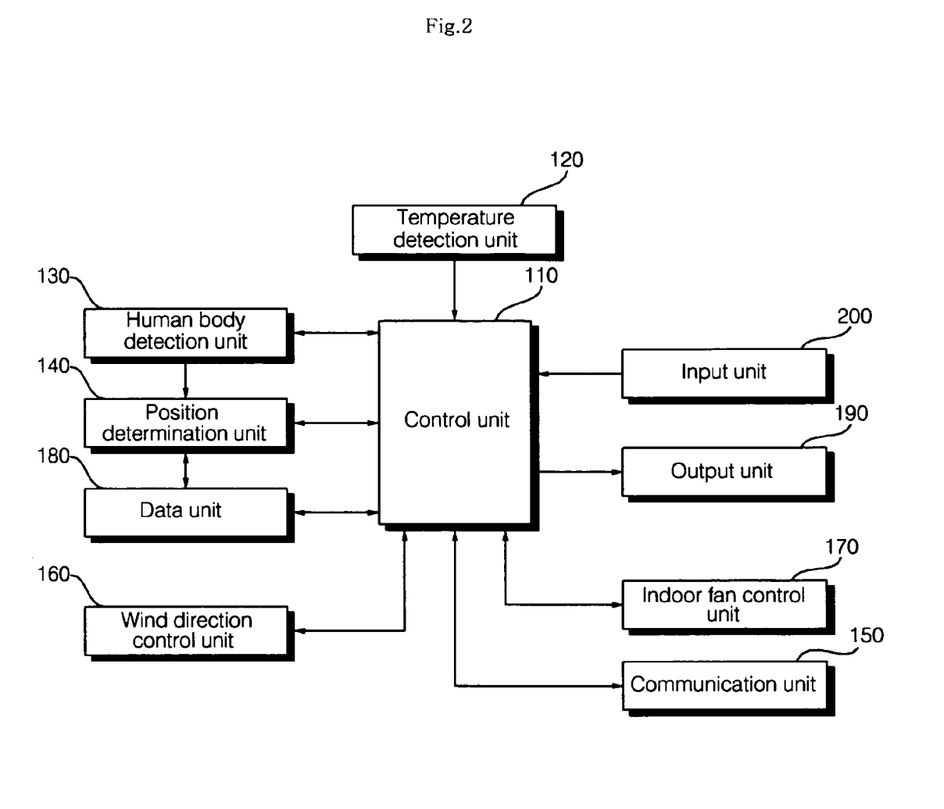
FIG. 2 is a block diagram showing the construction of an indoor unit according to an embodiment of the present invention.

FIG. 2 is a block diagram showing the construction of the indoor unit according to an embodiment of the present invention.

Referring to FIG. 2, the main body of the indoor unit is constructed as described above and is configured to include a temperature detection unit 120, an input unit 200, an output unit 190, a data unit 180, a human body detection unit 130, a position determination unit 140, a communication unit 150, a wind direction control unit 160, an indoor fan control unit 170, and a control unit 110 for controlling the entire operation of the indoor unit.

The wind direction control unit 160 and the indoor fan control unit 170 are connected to a motor. The main body controls wind direction control means, included in the respective discharge ports, and also controls the indoor fan so that the indoor fan performs a rotation operation.

The temperature detection unit 120 includes a plurality of temperature sensors. The temperature detection unit 120 detects a temperature of air which is sucked in to or discharged from the indoor unit, a temperature of air discharged indoors, a pipe temperature of the refrigerants sucked in to the indoor heat exchanger, and a pipe temperature of the refrigerants discharged from the indoor heat exchanger and transmits the detected temperatures to the control unit 110.

The temperature detection unit 120 may also be placed outside the indoor unit. Here, temperature values detected using a wired or wireless method may be received through the communication unit 150 and then applied to the control unit 110.

Here, the temperature detection unit 120 may measure an indoor temperature by detecting a blown temperature for the temperature of air discharged indoors and detecting a temperature sucked in indoors. The indoor temperature may be measured by a local controller and then input through the communication unit 150, according to circumstances.

The input unit 200 receives setting data, such as operation setting or operation mode of the air conditioner, and applies the received setting data to the control unit 110. The input unit 200 may include at least one switch or button, a touch key, a touch pad, or a touch screen and may receive data through the manipulation of the button or touch.

The output unit 190 outputs the menu screen of the indoor unit and outputs data, input through the input unit 200, and data transmitted or received through the communication unit 150. Further, when the air conditioner operates according to a control command of the control unit 110, the output unit 190 outputs an operating state, etc. of the air conditioner. The output unit 190 may be placed on the front side of the main body of the indoor unit, as shown in FIG. 1(a), or may be placed on the top of the front panel or on the lower side of the upper discharge port according to circumstances.

The output unit 190 includes display means for outputting text and images. The output unit 190 may further include sound output means for outputting specific sound, such as effect sound, alarm, and voice guidance, and a lamp configured to turn on or off or to output operation information according to emission color.

The communication unit 150 exchanges data with the outdoor unit, or other indoor units or other local controllers using a wired or wireless communication method.

The communication unit 150 may use not only wired communication using wired cables, power line communication, and wired communication methods, such as a wired LAN, but also short distance wireless communication methods, such as infrared rays, Bluetooth, RF communication, and Zigbee communication or wireless communication methods, such as a wireless LAN, WiBro, and high-speed mobile communication.

The data unit 180 stores data, such as control data used to operate the air conditioner, screen configuration data output through the output unit 190, and effect sound data. The data unit 180 further stores position detection data, used by the position determination unit 140 in order to analyze signals detected by the human body detection unit 130, and data used to set an operation based on an indoor area scanned by the position determination unit 140, an indoor temperature, a setting mode, or a required load. In particular, the data unit 180 stores priority data for a plurality of areas when a position is determined.

The human body detection unit 130 is placed on the top or lower side of the main body of the indoor unit as described above with reference to FIG. 1 and is configured to rotatably operate and detect a person within a room while scanning the indoor area. Here, the human body detection unit 130 may detect the human body using infrared rays or may detect the human body using the radiation heat of the human body.

The human body detection unit 130 includes at least one sensor for detecting the human body, a rotation unit for rotating the sensor, and so on.

The human body detection unit 130 is configured to rotatably operate according to a control command of the control unit 110 and to scan the indoor area while rotating in the first rotation direction or the second rotation direction. The human body detection unit 130 may divide and scan the indoor area according to a short distance and a long distance and also may divide the indoor area into the left, right, and central portions and scan each of the divided areas.

For example, the human body detection unit 130 may scan the indoor area at time intervals of about 25 to 50 seconds and apply scanned data to the position determination unit 140. Here, the time that the human body detection unit 130 takes to scan the indoor area once may differ depending on its installation position or structure. In the case where the human body detection unit 130 is installed as shown in FIG. 1(a), the time that the human body detection unit 130 takes to scan the indoor area once may be about 30 seconds. In the case where the human body detection unit 130 is installed as shown in FIG. 1(b), the time that the human body detection unit 130 takes to scan the indoor area once may be about 45 seconds because a scanning angle is great.

The position determination unit 140 detects the human body based on signals input through the human body detection unit 130. Here, the position determination unit 140 detects the human body and determines a position of the human body, on the basis of previously stored position detection data and reference data for determination.

If the indoor area is repeatedly scanned several times by the human body detection unit 130, the position determination unit 140 accumulates and stores the scanned data in the data unit 180, and detects the human body and determines a position of the human body according to the frequency of detection using the accumulated data. The position determination unit 140 transmits the determination results to the control unit 110.

Here, the position determination unit 140 may distinguish a distance up to a person within a room and angle data from the detected data, calculate the frequency by accumulating the distance data, and immediately apply the angle data to the control unit 110 so that the discharge angle of a louver is changed by the wind direction control unit 160.

The position determination unit 140 determines a position of the person within the room based on the reference data, data depending on position determination, and the priority data stored in the data unit 180. If an area where the human body has been detected is plural, the position determination unit 140 determines a position of the person within the room by primarily considering a long distance.

Further, in the case where a plurality of persons is placed within a room, the position determination unit 140 determines that the human body is placed in an area where the frequency of detection on the human body is high by primarily considering a long distance.

The control unit 110 sets the volume of air and the direction of the wind on the basis of the determination result data, received from the position determination unit 140, and applies a control command for controlling an air current based on the set data to the wind direction control unit 160 and the indoor fan control unit 170.

In the case where an automatic operation mode based on the detection of the human body has been set, the control unit 110 determines a reference temperature set according to a desired temperature, detects a current indoor temperature through the temperature sensor 120, determines whether the detected indoor temperature satisfies the reference temperature, and performs a preparation operation or an automatic operation based on the detection of the human body according to the determination results. Here, the control unit 110 checks the reference temperature, set according to the desired temperature, with reference to a reference temperature table stored in the data unit 180.

In the case where the detected indoor temperature does not satisfy the reference temperature set according to the desired temperature, the control unit 110 does not perform the automatic operation and performs a preparation operation by opening all the discharge ports and setting full swing so that a current of air reaches the entire indoor irrespective of the human bodies detected. If the above condition is satisfied, the control unit 110 immediately performs the automatic operation. In the case where the indoor temperature does not satisfy a second reference temperature, the control unit 110 stops the automatic operation according to the detection of the human body and performs the preparation operation. If the indoor temperature does not reach the reference temperature even although the preparation operation has been performed for some hours, the control unit 110 immediately performs the automatic operation.

Although the automatic operation is being performed or the preparation operation for performing the automatic operation is being performed, if an automatic operation mode termination request is received or the automatic operation mode satisfies a termination condition as described above, the control unit 110 terminates the automatic operation mode and performs an ordinary operation. For example, if an operation mode, such as heating, dehumidification, artificial intelligence, air cleaning, ventilation, or a heater, is set or if a supplementary function, such as a power saving operation, a long power operation, or a turbo operation, is set, the control unit 110 terminates the automatic operation mode based on the detection of the human body.

In the case where a sleep operation has been set or while the sleep operation is being performed, although the setting of the automatic operation mode based on the detection of the human body is input, the control unit 110 disregards the input and maintains the sleep operation. Here, the control unit 110 may control the output unit 190 so that the output unit 190 outputs a guidance message, indicating that the setting of the automatic operation mode is impossible. Further, if the setting of the volume of air or the direction of the wind calculated according to the position of the person within the room, detected by the position determination unit 140, is changed by a local controller, etc. through the input unit 200 or the communication unit 150, the control unit 110 terminates the automatic operation mode.

In this case, the control unit 110 receives detection results from the human body detection unit 130 and the position determination unit 140 and controls the wind direction control unit 160 and the indoor fan control unit 170 based on the received detection results so that the direction of the wind or the volume of air discharged indoors are set or changed.

When angle data, which belongs to the detected position information about the person within the room, is received from the position determination unit 140, the control unit 110 applies a control command to the wind direction control unit 160 in response to the received angle data.

The wind direction control unit 160 controls the opening or closing of each of the left discharge port, the right discharge port, and the upper discharge port according to the control command of the control unit 110 and also controls the directions of the discharge ports. Here, the wind direction control unit 160 sets a discharge angle based on the received angle data and controls the left and right directions of a discharged air by changing voltage or current which is applied to the motor connected to the wind direction control means, such as the vanes.

Here, the wind direction control unit 160 receives angle data, which belongs to data detected by the human body detection unit 130, at specific intervals through the position determination unit 140 and the control unit 110 and controls the wind direction control means of each of the discharge ports when the angle data or discharge angle set data corresponding to the angle is received. That is, the wind direction control unit 170 controls the wind direction control means according to the angle data, received at intervals of 25 to 50 seconds, so that the direction of an air current is periodically changed.

The indoor fan control unit 170 drives the indoor fan by operating the motor according to a control command of the control unit 110 and controls the number of rotations of the motor.

Here, the indoor fan control unit 170 variably changes the volume of air depending on a short distance, a middle distance, or a long distance based on the results determined by the position determination unit 140. In the case of a long distance, the indoor fan control unit 170 sets the volume of air to a maximum air volume. Alternatively, the indoor fan control unit 170 may receive data according to a distance and control up and down discharge angles based on the received data.

If an operating state of the air conditioner is changed, the control unit 110 controls the output unit 190 so that the output unit 190 outputs the changed operation state in the form of at least one of text, images, sound, and a warning flare so that users can recognize the changed operating state.

Meanwhile, if the human body is not detected during the automatic operation, the control unit 110 maintains the last operating state according to the automatic operation, unless the automatic operation mode is terminated according to the above-described conditions.

An operation of the present invention constructed as above is described below with reference to the drawings.

Figure 3:
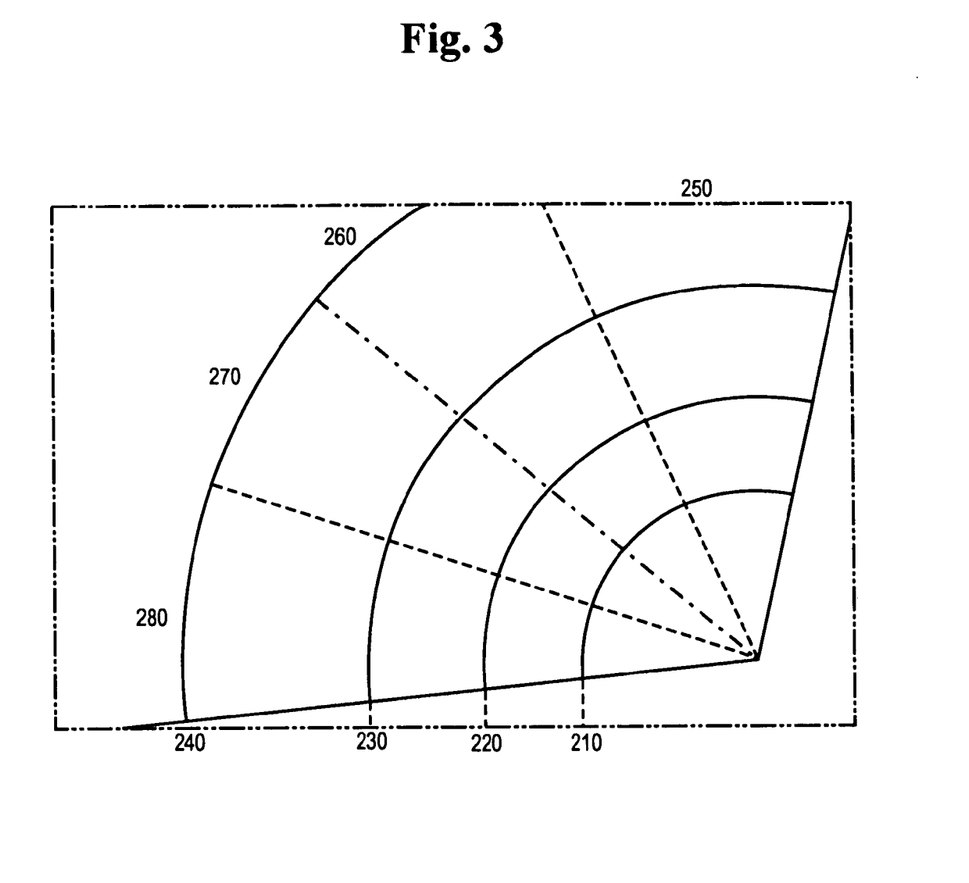
FIG. 3 is a flowchart showing an example in which, when the air conditioner according to an embodiment of the present invention detects the human body, an indoor area is divided into a plurality of areas.

FIG. 3 is a flowchart showing an example in which, when the air conditioner according to an embodiment of the present invention detects the human body, an indoor area is divided into a plurality of areas.

As shown in FIG. 3, an indoor area is divided into a plurality of areas. When data is received from the human body detection unit 130, the position determination unit 140 determines an area to which a current of air will be supplied, which belongs to the divided areas.

The position determination unit 140 determines an area for a person within the room based on distance data and angle data from among the received data. Here, the position determination unit 140 immediately applies the angle data to the control unit 110, accumulates and stores the distance data in the data unit 180, and calculates the frequency based on the distance data accumulated at specific times. The position determination unit 140 determines an area having the highest frequency as an area where the person within the room is placed.

In this case, the position determination unit 140 uses the distance data and divides each of the areas into a short distance area 210-220, a middle distance area 220-230, and a long distance area 230-240. Although each of the areas may be subdivided into areas according to circumstances, a case where each of the areas is divided into the above three areas is described below as an example.

Since the angle data detected by the human body detection unit 130 is angle values detected on the basis of the main body of the indoor unit, the position of the human body is subdivided into an angle value and then displayed. However, each of the position determination unit 140 and the wind direction control unit 160 chiefly divides the indoor area into a left area 280, a right area 250, and central areas 260 and 270. When a person within the room is placed in any one of the right, left, and central areas, each of the position determination unit 140 and the wind direction control unit 160 controls a corresponding discharge port so that a current of air reaches the corresponding area. In this case, although the central areas may be divided into a left central area 270 and a right central area 260, they may be also recognized as one central area.

The position determination unit 140 determines the position of the person within the room based on the control data from the human body detection unit 130, which is received at intervals of about 25 to 45 seconds. The position determination unit 140 determines an area having high frequency every time in the case of distance data, accumulates the distance data at specific times, and determines the position of the person within the room on the basis of the frequency. After the position of the person within the room has been calculated based on the accumulated data, the position determination unit 140 transmits the determination results to the control unit 110.

The control unit 110 applies a control command corresponding to the direction of the wind and the volume of air, set based on the determination results of the position determination unit 140, to each of the wind direction control unit 160 and the indoor fan control unit 170. Here, the control unit 110 controls the current of air so that it is supplied to the person within the room or his neighbor areas through the setting of direct wind or indirect wind.

For example, a case where each of three areas is repeatedly detected six times is listed in the following table 1. A first area corresponds to the short distance area 210-220, the second area corresponds to the middle distance area 220-230, and the third area corresponds to the long distance area 230-240.

TABLE 1

|  | FIRST AREA | SECOND AREA | THIRD AREA |
|---|---|---|---|
| ONE TIME | 1 |  |  |
| TWO TIMES |  | 1 |  |
| THREE TIMES |  |  | 1 |
| FOUR TIMES |  |  | 1 |
| FIFTH TIMES |  | 1 |  |
| SIX TIMES |  |  | 1 |

In the case where the human body is detected as in the table 1 (i.e., the human body is detected in the first area on the first round of detection and the human body is detected in the second area on the second round of detection), the detection data is accumulated as many as specific times. The number of times of the human body detected is calculated in each of the first, second, and third areas during the six times (for example, the first area is once, the second area is twice, and the third area is three times). As listed in the table 1, the third area having the highest frequency is determined as an area where the person within the room is placed.

If several persons are placed within a room, an area on the basis of the frequency every time is primarily selected, a reference frequency is accumulated, and areas where the persons are placed are then determined based on the accumulated data.

TABLE 2

|  | FIRST AREA | SECOND AREA | THIRD AREA | PRIMARY DETERMINATION |
|---|---|---|---|---|
| ONE TIME | 2 | 1 |  | FIRST AREA |
| TWO TIMES | 1 | 2 |  | SECOND AREA |
| THREE TIMES |  | 1 | 1 | THIRD AREA |
| FOUR TIMES | 1 | 2 |  | SECOND AREA |
| FIFTH TIMES | 1 | 1 |  | SECOND AREA |
| SIX TIMES | 1 |  |  | FIRST AREA |

If, on the first round of detection, the human body is detected twice in the first area and the human body is detected once in the second area as in the table 2, the first area having high frequency is primarily determined. On the second round of detection, the second area having high frequency is primarily determined. On the third round of detection, the third area (i.e., the long distance) is primarily determined because the second and third areas have the same frequency. Here, as described above, the first area corresponds to the short distance area 210-220, the second area corresponds to the middle distance area 220-230, and the third area corresponds to the long distance area 230-240.

In the case where the human body is detected six times as described above, an area is primarily determined every time, and the positions of the persons within the room according to the frequency are finally determined based on the primarily determined results. In other words, it is determined that the persons are placed in the second area because, as a result of the primary determination, the second area has the highest frequency.

Figure 4:
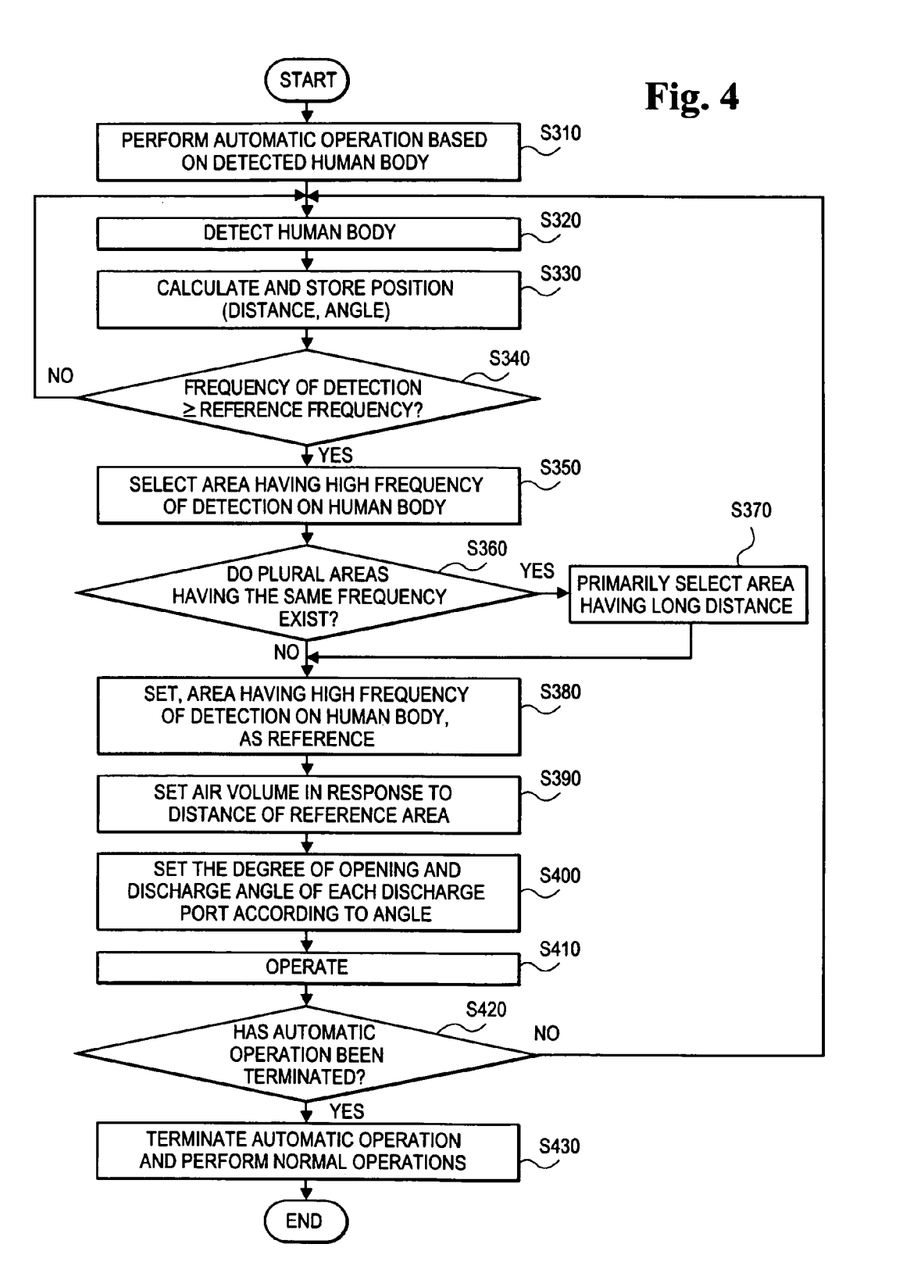
FIG. 4 is a flowchart showing a method of calculating a position of a person within a room in the air conditioner according to an embodiment of the present invention.

FIG. 4 is a flowchart showing a method of calculating a position of a person within the room in the air conditioner according to an embodiment of the present invention.

Referring to FIG. 4, when the automatic operation mode is set according to an automatic operation condition, the air conditioner performs the automatic operation based on the detection of the human body at step S310.

The human body detection unit 130 detects the human body using a radiation heat by scanning an indoor area and sends detection values to the position determination unit 140 at step S320. The position determination unit 140 accumulates and stores the received detection values in the data unit 180 at step S330 and determines a position of a person within the room based on distance data and angle data of the stored data.

The position determination unit 140 determines a position of a person within the room based on data input every time and accumulates and stores the determined position data. The position determination unit 140 then determines whether the frequency of detection is a reference frequency or more at step S340. If, as a result of the determination, the frequency of detection is determined to be the reference frequency or more, the position determination unit 140 calculates the position of the person within the room by calculating an area where the frequency of detection on the human body is high based on the stored data at step S350. However, if, as a result of the determination at step S340, the frequency of detection is determined to be less than the reference frequency, the human body detection unit 130 detects the human body by repeatedly scanning the indoor area up to the reference frequency and stores detected data in the data unit 180 through the position determination unit 140 at steps S320 to S340.

In the case where the position of the human body is detected on the basis of the frequency, it is determined whether there exists a plurality of areas having the same frequency at step S360. If, as a result of the determination, the plurality of areas having the same frequency is determined to exist, an area according to the position of the person within the room is selected by primarily considering a long distance at step S370.

If, as a result of the determination at step S360, the plurality of areas having the same frequency is determined not to exist, an area on which the control of an air current will be performed is selected on the basis of an area where the frequency of detection on the human body is high at step S380. Here, the area selected on the basis of the frequency corresponds to an area for a distance from the main body of the indoor unit, and the position of the person within the room may be determined according to a short distance, a middle distance, and a long distance.

After the area according to the position of the person within the room is finally selected as described above, the volume of air is set according to the distance using the corresponding area as a reference area at step S390. The degree of opening and a discharge angle of each of the discharge ports are then set according to an angle at step S400. Here, the degree of opening and the discharge angle of each of the discharge ports are not set using the accumulated and stored data, but using angle data detected by the human body detection unit 130 every time.

After the position of the person within the room has been detected as described above, the indoor unit operates based on the detected position, thus providing a current of air to the corresponding area or its neighbor areas at step S410.

It is then determined whether the automatic operation mode has been terminated at step S420. If, as a result of the determination, the automatic operation mode is determined not to have been terminated, the human body is repeatedly detected, an area corresponding to a position of the person within the room is repeatedly accumulated and stored, an area having the highest frequency is selected, and a current of air is performed at steps S320 to S420.

Here, the direction of the wind or the volume of air during the automatic operation is set on the basis of the position of the person within the room. For example, in the case where a person within the room is placed on the left side in a short distance, when direct wind is set, the direction of the wind may be adjusted by controlling the up and down directions of the wind, and the opening and closing and a discharge angle of each of the left and right discharge ports, so a current of air can reach the position of the person within the room. Further, in the case where the person within the room is placed at a central area in a long distance, a discharge angle of the upper discharge port may be controlled up and down so that a current of air can reach the long distance, and only the upper discharge port may be opened or all the upper, left, and right discharge ports may be opened, but a discharge angle of each of the discharge ports may be directed toward the central area.

If, as a result of the determination at step S430, the automatic operation mode is determined to have been terminated or the termination condition for the automatic operation mode is satisfied, the automatic operation mode is terminated, and an ordinary operation is performed at step S430.

Figure 5:
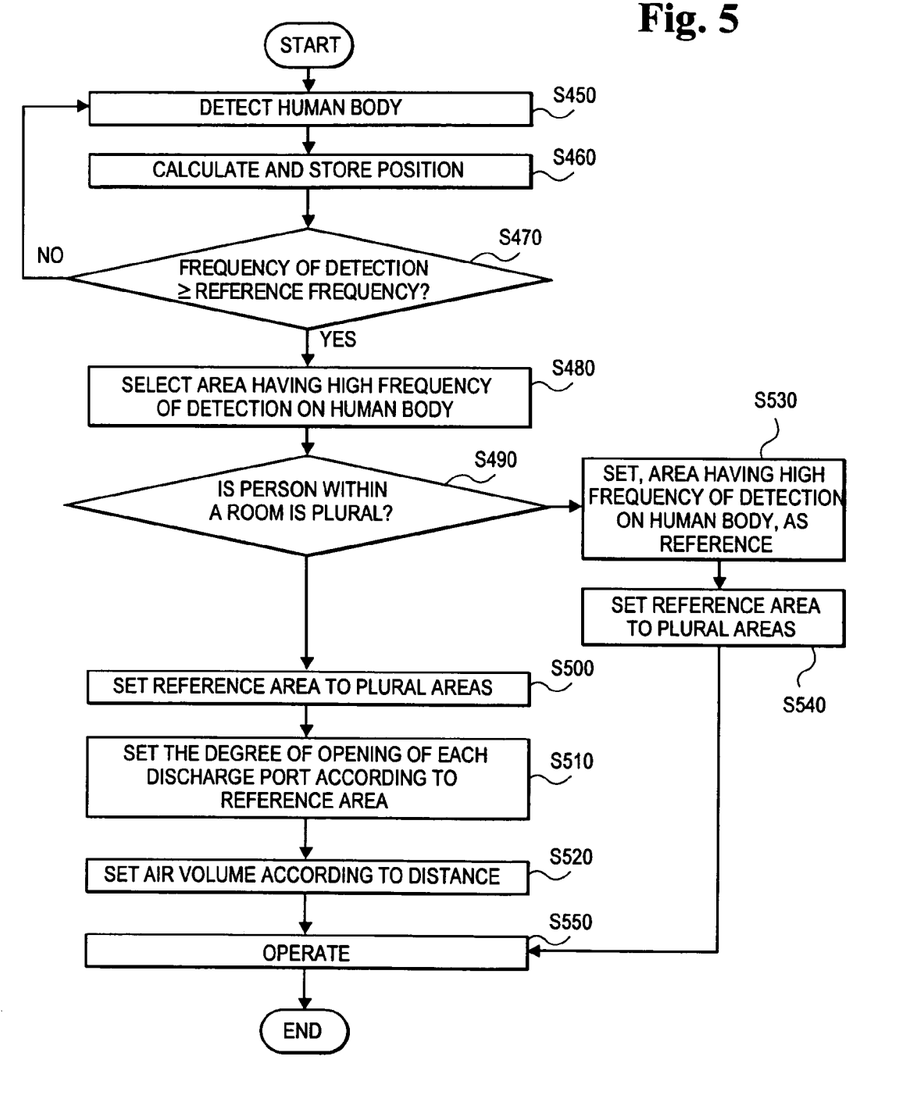
FIG. 5 is a flowchart showing a method of calculating positions of a plurality of persons within a room in the air conditioner according to an embodiment of the present invention.

FIG. 5 is a flowchart showing a method of calculating positions of a plurality of persons within the room in the air conditioner according to an embodiment of the present invention.

Referring to FIG. 5, when the automatic operation mode is set, the air conditioner performs the automatic operation based on the detection of the human body according to an automatic operation condition. Here, if a specific operation condition is satisfied, the automatic operation is performed and, if the specific operation condition is not satisfied, the automatic operation may be stopped or terminated.

The human body detection unit 130 rotatably operates and scans an indoor area. In this case, the human body detection unit 130 detects the human body using a radiation heat of the human body at step S450. When detection values are received from the human body detection unit 130, the position determination unit 140 calculates and stores a position of a person within the room based on distance and angle data from among the detection values. Here, in the case where there exists a plurality of areas where the human body is detected on the first round of detection, an area having high frequency is primarily determined as the position of the person within the room within the results detected on the first round of detection at step S460.

Here, the determined area is a distance from the main body of the indoor unit as described above, and the left and right directions (i.e., an angle) is controlled according to the angle data applied to the wind direction control unit 160 whenever the human body is detected every round of detection. Alternatively, the opening or closing of each of the discharge ports is determined according to circumstances.

If the frequency of detection on the human body is less than a reference frequency, an area on the basis of the frequency every round of detection is primarily determined by repeatedly performing the above process, and the results are stored at steps S450 to S470.

However, if the frequency of detection on the human body is the reference frequency or more, the frequency for the primarily determined result is calculated, and an area where the frequency of detection on the human body is the highest is selected at step S480. It is then determined whether there is a plurality of persons within the room at step S490. If, as a result of the determination, the plurality of persons is determined to exist in the room, a plurality of reference areas is set at step S500. Here, the number of reference areas may be limited.

In the case where a plurality of reference areas is allowed as described above, the human body, detected in each of a plurality of areas every round of detection, may be accepted according to circumstances. The frequency for a total of the reference frequencies in the respective areas may be calculated irrespective of primarily determined results, and the reference areas may be set.

In other words, in the table 2, the frequencies, for example, a total of six times in the first area, a total of seven times in the second area, and once in the third area, may be calculated irrespective of primary determination every round of detection, and the second area having the highest frequency may be selected as the reference area.

The degree of opening of each of the discharge ports and a discharge angle of each of the discharge ports are determined based on the reference area and the angle data at step S510. The volume of air according to a distance for the reference area is then set at step S520.

The air conditioner is operated according to the volume of air and the direction of the wind set as described above at step S550.

However, if, as a result of the determination at step S490, the plurality of persons is determined not to exist in the room, it is meant that a plurality of reference areas is not allowed. In this case, whenever the human body is detected every round of detection, the frequencies for all reference frequencies are calculated based on respective primary determination results, and an area having the highest frequency is set as a reference area.

That is, as in the table 2, a primarily determined result is stored according to the frequency every round of detection and, as a result of the primary determinations for a total of six times, an area having the highest frequency is set as a reference area at step S530. Here, if areas have the same frequency, an area having a long distance is primarily selected.

Accordingly, the direction of the wind and the volume of air are set at step S540, and the air conditioner is operation based on the set direction of the wind and the set volume of air, so a current of air can be supplied to the person within the room through direct wind or indirect wind at step S550.

As described above, according to the present invention, areas according to distances from the main body of the indoor unit are set on the basis of the frequency of detection using data which is accumulated and detected several times so that a plurality of person who stay in a room or a person who moves within a room can be taken into consideration. A current of air is supplied by changing a right or left discharge angle whenever the human body is detected every round of detection. Accordingly, a current of air is not supplied to a fixed position, but can be variously provided to a person within the room. Further, a more comfortable indoor environment can be provided because a current of air is supplied with an area frequently used by persons within a room taken into consideration.

While the present invention has been shown and described in connection with the exemplary embodiments thereof, those skilled in the art will appreciate that the present invention may be changed and modified in various ways without departing from the spirit and scope of the present invention as defined in the following claims.

What is claimed is:

1. An air conditioner, comprising:
a human body detection unit configured to rotatably operate and to detect a person within an indoor area;
a position determination unit configured to use data detected by the human body detection unit to:
determine a position of the person, from among a plurality of areas within the indoor area, and
set at least one of the plurality of areas as a reference area to which a current of air will be provided according to a frequency of detection of the person within each of the plurality of areas; and
a control unit configured to control the current of air based on the determination results by the position determination unit so that the current of air is discharged toward the reference area,
wherein, if the human body detection unit detects the person by a reference frequency or more, the position determination unit calculates a total of frequencies of detection of the person in each of the plurality of areas and sets an area having a highest frequency as the reference area.

2. The air conditioner as claimed in claim 1, further comprising a wind direction control unit configured to control a direction of the discharged air in response to a control command of the control unit,
wherein the wind direction control unit receives angle data for the reference area from the position determination unit and changes left and right discharge angles of each of discharge ports based on the received angle data.

3. The air conditioner as claimed in claim 1, further comprising an indoor fan control unit configured to control the intensity of the discharged air in response to a control command of the control unit,
wherein the indoor fan control unit receives distance data for the reference area from the position determination unit and sets an air volume based on the received distance data.

4. The air conditioner as claimed in claim 1, wherein, if, as a result of the detection on the person through the human body detection unit, there is a plurality of areas where the person is detected, the position determination unit temporarily sets an area where the person is placed in response to the frequency of detection depending on detection on the person on a round of detection.

5. The air conditioner as claimed in claim 4, wherein, after the human body detection unit has detected the person by the reference frequency or more, the position determination unit totals the areas temporarily set every round of detection and finally sets an area having a high frequency of detection, which belong to the temporarily set areas, as the reference area.

6. The air conditioner as claimed in claim 5, wherein, if areas having the same frequency of detection exist, the position determination unit primarily sets an area having a long distance, which belongs to the areas, as the reference area.

7. A method of operating an air conditioner, comprising the steps of:
a human body detection unit rotatably operating, detecting a person within a plurality of areas within an indoor area, and storing the detection data, and when a frequency of detection is a reference frequency or more,
calculating a total of the frequencies of detection in each of the plurality of areas by accumulating results based on the detection data;
setting an area having a high frequency of detection, from among the plurality of areas, as a reference area; and
setting an air volume for the reference area and providing a current of air toward the reference area.

8. The method as claimed in claim 7, further comprising, after the detection and storing step, the step of setting a discharge angle of each of discharge ports in response to angle data according to the detection on the person.

9. The method as claimed in claim 7, further comprising, after the detection and storing step, the step of, if the person is detected within a plurality of areas, calculating a frequency of detection every round of detection and primarily determines areas according to positions of the person.

10. The method as claimed in claim 9, wherein the step of setting the reference area comprises, if the person is detected in a plurality of areas, totaling the primarily determined results and setting an area, having a high frequency of detection, as the reference area.

11. The method as claimed in claim 10, wherein the step of setting the reference area comprises, when there are areas having the same frequency of detection, setting the reference area by primarily considering an area having a long distance.

* * * * *